INVENTOR.
William Wockenfuss,
BY
ATTORNEY.

July 31, 1951 W. WOCKENFUSS 2,562,249
SENSING AND ANALYZING MEANS IN RECORDING MACHINES
Filed May 20, 1947 5 Sheets-Sheet 2
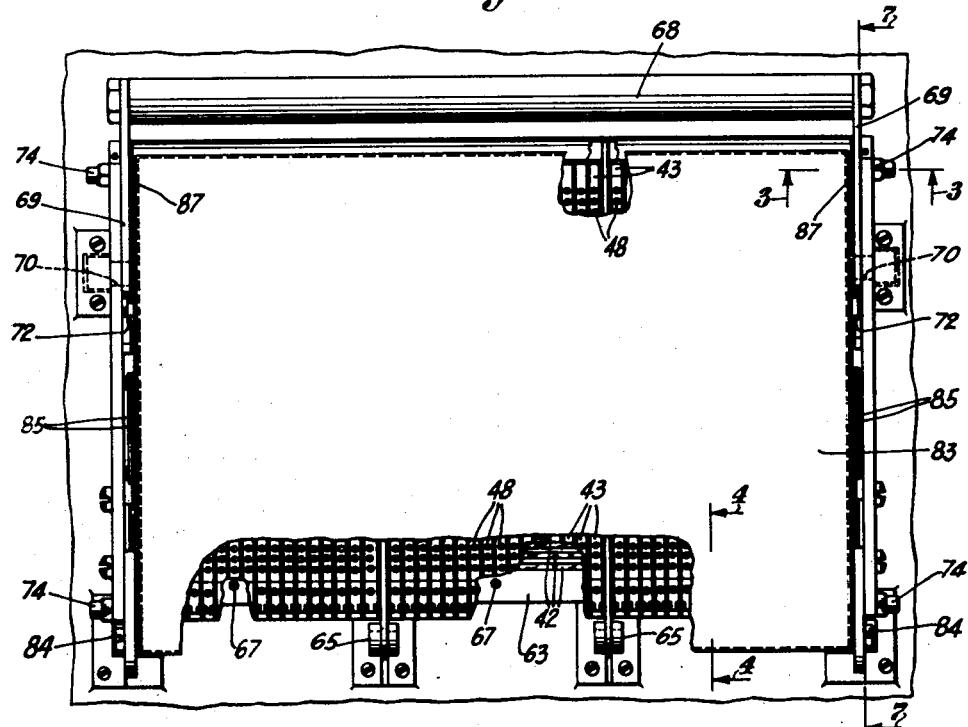
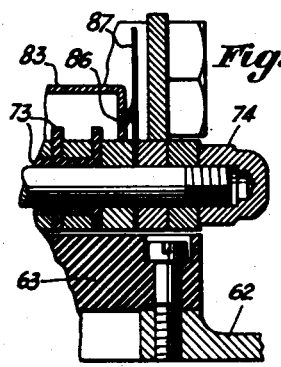
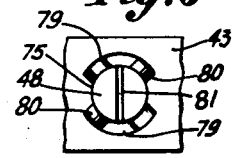
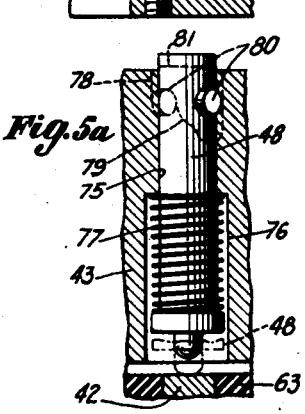
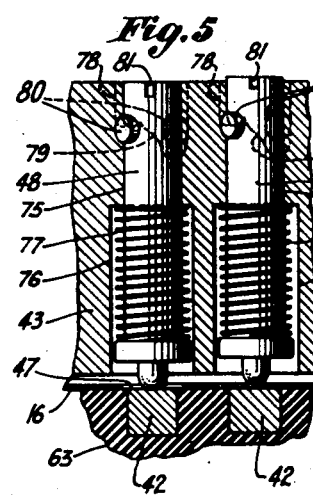
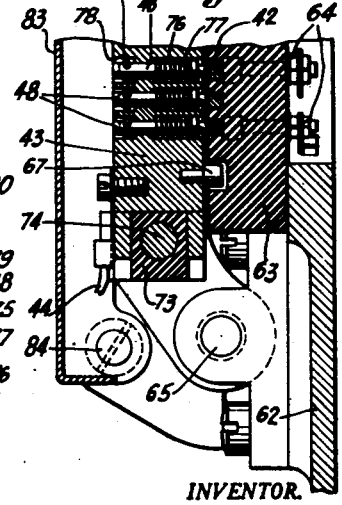
INVENTOR.
William Wockenfuss,
BY
Edward L. Mueller
ATTORNEY.

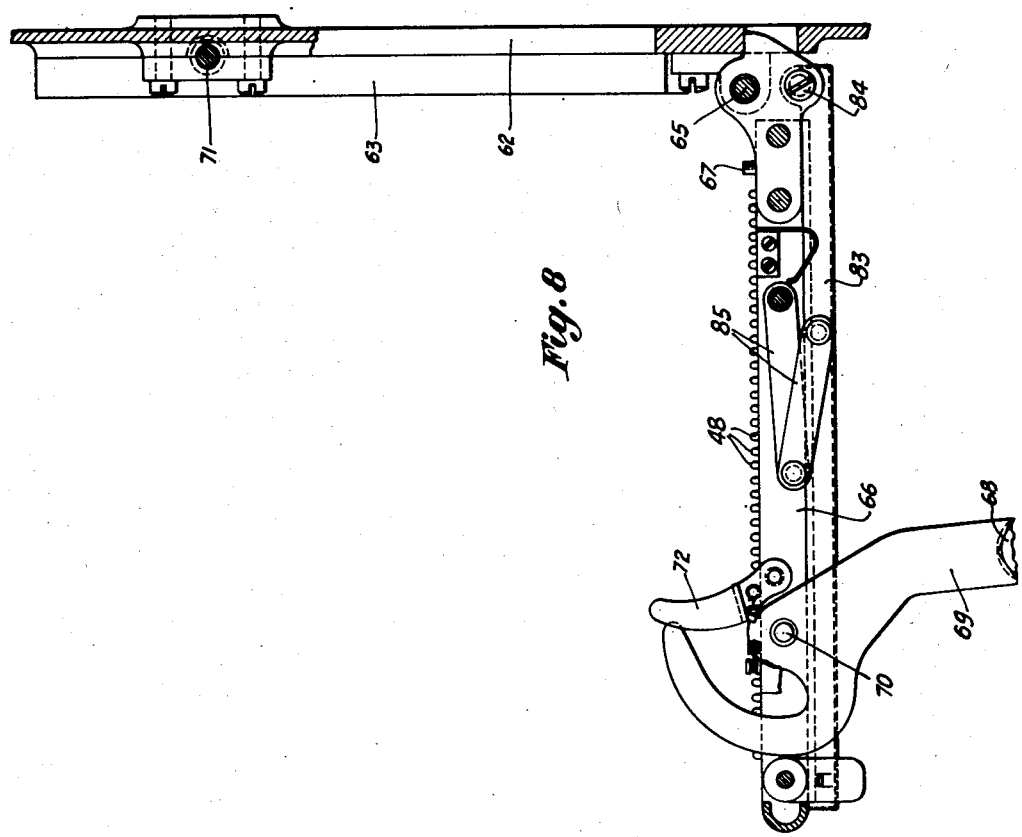
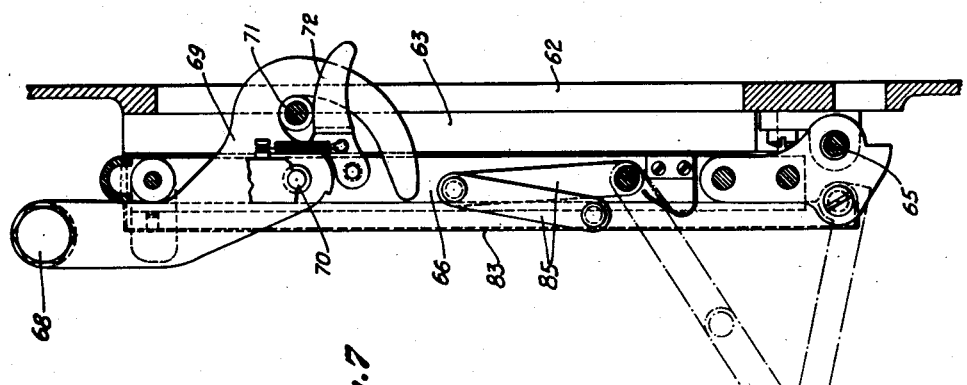

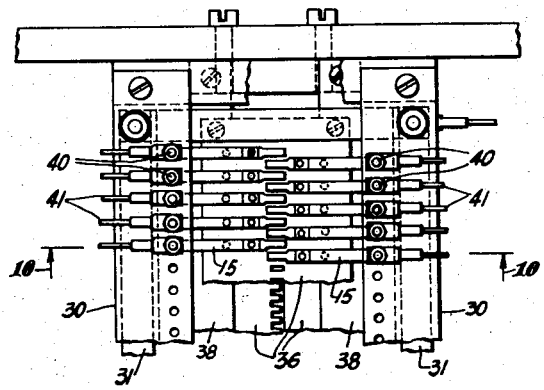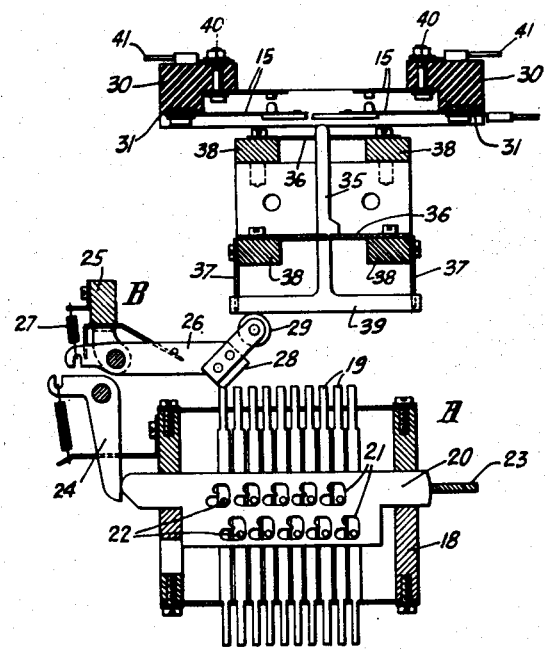

July 31, 1951 — W. WOCKENFUSS — 2,562,249
SENSING AND ANALYZING MEANS IN RECORDING MACHINES
Filed May 20, 1947 — 5 Sheets-Sheet 5

INVENTOR.
William Wockenfuss,
BY
Edward L. Panella
ATTORNEY.

Patented July 31, 1951

2,562,249

UNITED STATES PATENT OFFICE 2,562,249

SENSING AND ANALYZING MEANS IN RECORDING MACHINES

William Wockenfuss, Union, N. J., assignor to Control Instrument Company, Inc., Brooklyn, N. Y., a corporation of New York Application May 20, 1947, Serial No. 749,386

9 Claims. (Cl. 101—93)

This invention relates to improvements in statistical card controlled machines and has particular reference to a tabulator.

In my co-pending application, Serial No. 676,520, filed June 13, 1946, there is illustrated a full mechanical tabulator wherein a scanning device cooperating with a card analyzer is utilized to transmit data through a controlled mechanism to a transfer unit including elements in the form of pins, capable of being selectively set up for various types of analytical reports, and in which said transfer unit is responsive to the data transmitted thereto for controlling the operation of a plurality of recording members, such as the type bars of the machine.

The present invention contemplates an improved machine of similar character wherein the transmission of data from a card analyzer to a scanning device and from thence through a transfer unit to the recording members is accomplished by electrical means in said units which are selectively settable in accordance with the particular type of analytical report desired.

The inventive idea involved is capable of receiving a variety of expressions, one of which, for purposes of illustration, is shown in the accompanying drawings; but it is to be expressly understood that said drawings are employed merely to facilitate the description of the invention as a whole and not to define the limits thereof, reference being had to the appended claims for this purpose.

In the drawings;

Fig. 2 is a front elevation, partly broken away, of the transfer unit employed;

Fig. 3 is an enlarged section on the line 3—3 of Fig. 2;

Fig. 4 is a similar section on the line 4—4 of Fig. 2;

Fig. 5 is an enlarged fragmentary sectional view showing the positions of the transfer or sensing elements or pins of the transfer unit with respect to a set-up sheet mounted between the cross bars of said unit;

Fig. 5a is a similar view of one of the transfer pins shown in full lines as adjusted to an inoperative position relative to the opposed cross bar, such adjustment being made when a set-up sheet is not employed, as in Fig. 5, and when the pin is to be rendered inactive for electrical contact with said bar;

Fig. 6 is a detail view showing one of the transfer pins in end elevation;

Fig. 7 is a section on the line 7—7 of Fig. 2, with the transfer unit in closed position;

Fig. 8 is a similar view showing the unit open;

Fig. 9 is a fragmentary plan view of the analyzing portion of the machine, illustrating principally the set of electrical contacts utilized to transmit data from the card analyzer to the transfer unit;

Fig. 10 is a section on the line 10—10 of Fig. 9;

The drawings illustrate only so much of the tabulating machine as is necessary for a complete understanding of the invention herein involved and have omitted therefrom, for purposes of brevity, various instrumentalities such as drives and control and totalizing mechanisms well known to those skilled in the art.

Figure 1:
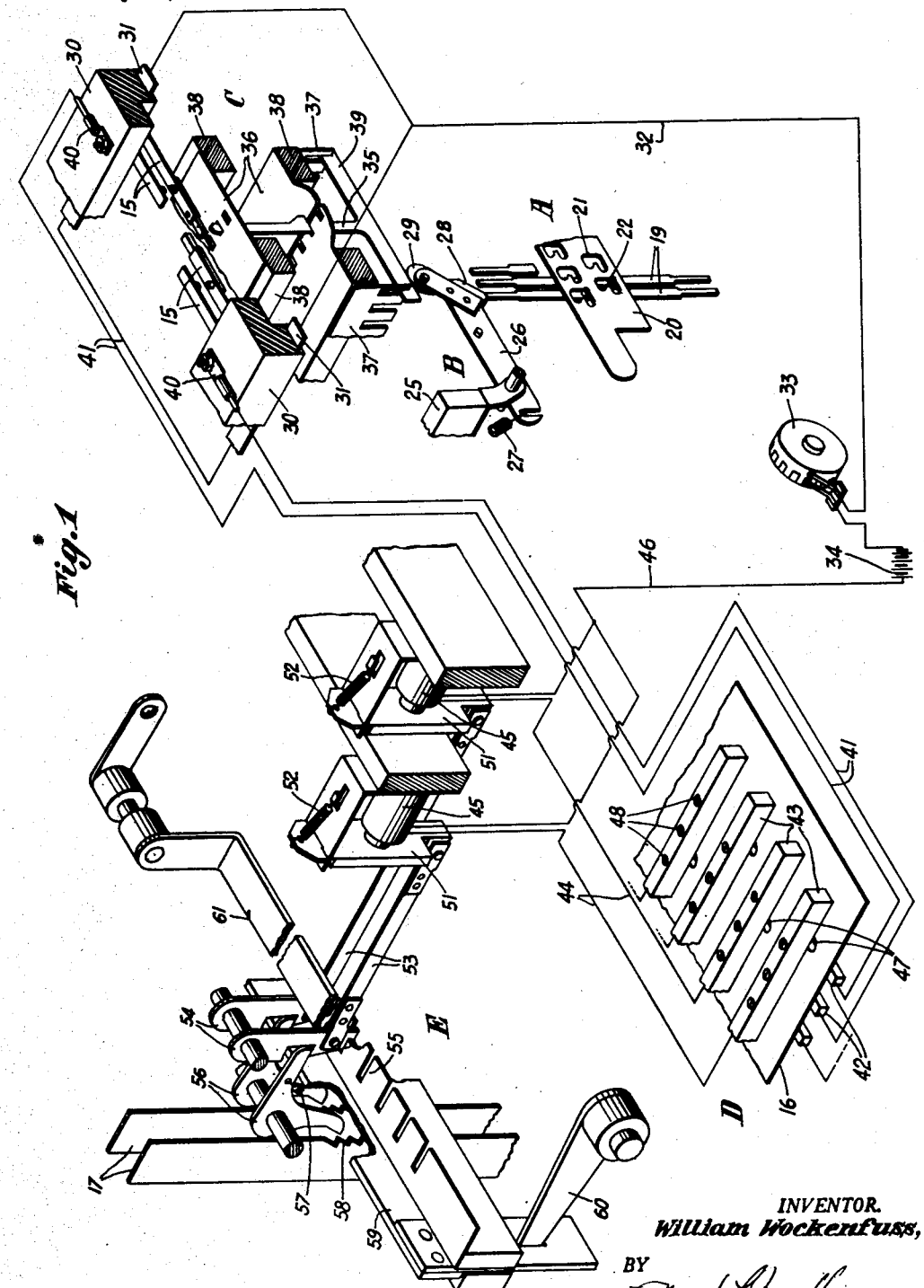
Fig. 1 is a fragmentary perspective view of the tabulator constructed in accordance with the present invention, parts being broken away and shown in section and other parts being diagrammatically illustrated.
Figure 11:
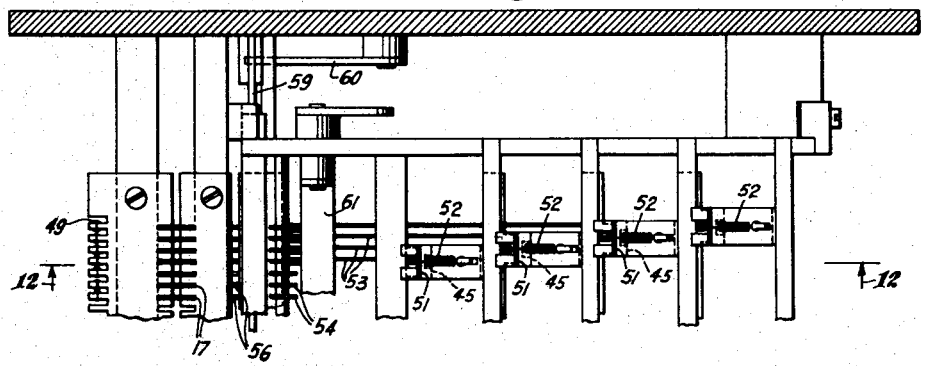
Fig. 11 is a fragmentary plan view, partly in section, of the control means for the recording members or type bars.

By reference to Fig. 1, it will be seen that, generally, the machine embodies a mechanical card analyzing mechanism partially shown at A and of a well known type in which the cards are momentarily stopped while all the columns thereof are simultaneously sensed for index point perforations therein. The elements of said analyzer pertinent to an understanding of the present invention are shown in more detail in Fig. 10. The data read from each successive card is transmitted, through a reciprocating scanning device B, to an analyzer controlled mechanism C consisting, essentially, of a plurality of sets of electrical contacts 15 equal to the number of columns in the cards. Said mechanism C is electrically connected to a transfer unit D for the transmission of data thereto and, by the insertion into said unit of a punched set-up sheet 16 (see also Fig. 5) prepared for any particular analytical report to be obtained, said unit D is controlled to further transmit the translated data to the tablulating section E of the machine which is herein shown as consisting of a plurality of vertically movable printing type bars 17 and associated parts.

With the transfer unit herein shown, it is possible to dispense with the use of a set-up sheet, such as 16, by effecting predetermined adjustments of the transfer elements of said unit in a manner which will be specifically described in connection with Fig. 5a.

As is well known, the card analyzer A comprises a lower vertically reciprocating pin box (not shown) over which the cards to be analyzed are passed, and an upper stationary pin box 18 (Fig. 10) having a plurality of columns of analyzing pins 19 vertically movable therein under the control of the pins in the lower box, the columns of pins 19 being equal to the number of card columns and sets of contacts 15. Each column of pins is provided with a lock plate 20 having a series of slots 21 therein into which project the studs 22 on said pins. A reciprocating bail 23, common to the lock plates 20, is operated in any well known manner and when moved to the right, immediately following the elevation of pins 19 in the various columns by sensing pins in the lower box, said plates 20 are also moved to the right by spring-urged levers 24 so that the studs 22 on the elevated pins 19 will enter the upper portions of their respective slots 21 to thus lock said pins in their elevated positions until the reciprocating scanning unit B has completed its operative movement to the right. Thereupon, the bail 23 restores and, in so doing, shifts the plates 20 to the left against the action of the levers 24 to thereby release the elevated pins 19 which then return to their lower positions by gravity. The scanning device B then returns to its starting point to complete the analyzing cycle.

Said scanning device is somewhat similar to the shown in the above identified patent application and may be controlled as illustrated therein, or in any preferred manner. The device comprises a reciprocating frame 25 from which is pivotally suspended a plurality of operating members 26, one for each column of pins 19. Said members 26 are in the form of levers each having a spring 27 connected to one end to urge the other end thereof downwardly. The latter end terminates in a cam 28 movable over the upper extremities of its associated pins 19 for contact therewith, and is further provided with a roller 29, the purpose of which will presently appear. During the operating stroke of the scanning device, which occurs immediately following the elevation of the pins 19 by their associated sensing pins, the cam 28 of each member 26 will ride over its associated pins 19 and upon contacting an elevated pin, the lever 26 will be raised against the action of its spring 27 to thus elevate the roller 29, thereby transmitting the translated data from the analyzed card to the controlled mechanism C.

The various sets of contacts 15 of the mechanism C, each of which is individual to a card column, are divided into two groups (Fig. 9) carried by opposed insulated mounting blocks 30, and are alternately arranged with their adjacent free extremities overlapped in order to conserve space. The lower contacts of each of the two groups are electrically connected to a common bus bar 31 and these bars are joined, in series, to a common conductor 32 leading to a commutator 33 which derives current from the source 34 and operates to establish a circuit through the contacts 15 after the latter have been closed, thus to prevent arcing at said contacts. For each set of contacts, there is provided an actuating member 35 of inverted T-shaped formation, the shank of which is guided for vertical movement in the superposed slotted plates 36 and the cross bar 39 of which is guided by the combs 37, both said plates and combs being supported by the framework 38 located below said groups of contacts. The cross bar 39 of each member 35 is sufficiently elongated to enable the roller 29 of the associated lever 26 to remain in contact therewith throughout the entire reciprocating movement of the scanning device B so that, regardless of which pin 19 in a row is elevated by the sensing of a hole in a card, the roller 29 of said lever will momentarily trip the actuating member 35 upwardly to close the associated set of contacts 15, whereupon the lever 26 will restore to normal after passing over the raised pin 19. This momentary closure of the set of contacts 15 connects the current source 34 to the terminal 40 of said set, to which is joined the conductor 41 leading to the transfer unit D, and thus an impulse is transmitted over said conductor. Only two of such conductors are shown, but it will be understood that there is one for each of the contact sets 15.

Each conductor 41 is electrically connected to one of the bus bars 42 forming part of the transfer unit D and there is one of such bars for each of the columns in the card being analyzed. Cooperating with said bars 42 are the electrically conducting cross bars 43, one for each of the type bars 17 and each of said bars 43 is connected, by a conductor 44, to a magnet 45 individual thereto and to one of said type bars. The windings of said magnets 45 are joined to a common conductor 46 leading to the current source 45, and thus a momentary energizing circuit for any one of the magnets is established when electrical connection is made between one of the bars 42 and the bar 43 individual to said magnet, at the instant that an impulse is transmitted to said bar 42 over its conductor 41. When such connections are accomplished by the use of the master set-up sheet 16, which is made of insulating material and perforated in accordance with any desired analysis to be obtained, such sheet is introduced between the bars 42, 43 and, when properly positioned, the holes 47 in said sheet will register with certain of the transfer elements or pins 48 carried by the bars 43 so that said pins will electrically contact a bar 42, as shown at the left in Fig. 5, or said pins will engage the sheet 16, as shown at the right of said figure, with the result that no electrical connection will be established between the pins and the opposed bars 42. The use of the sheet 16 may be dispensed with, in which case the pins 48 are individually adjusted, as indicated in dotted and full lines in Fig. 5a, to either engage or disengage the bars 42 depending upon the data to be transmitted to the type bars 17.

Figure 12:
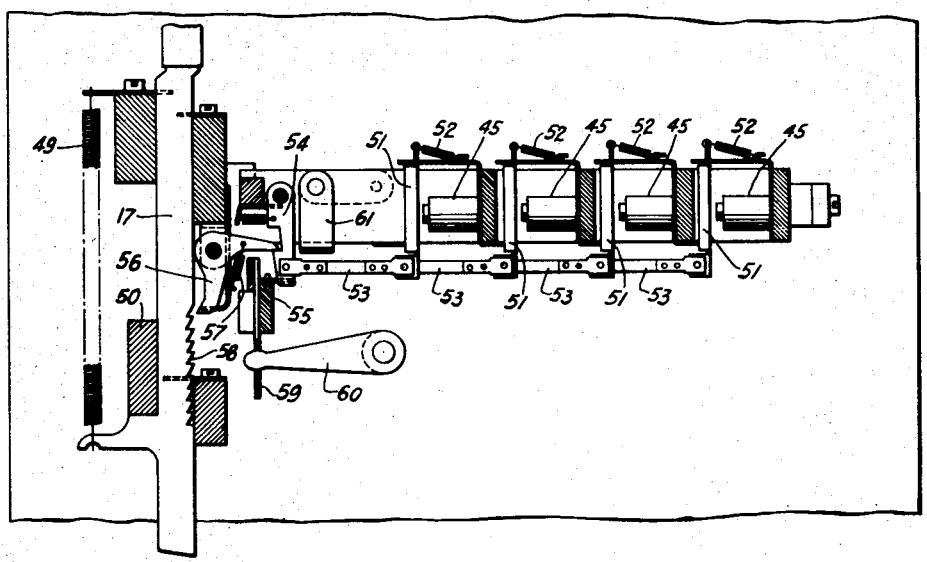
Fig. 12 is a section on the line 12—12 of Fig. 11.

In either of the above cases, wherever electrical connection is established between any of the bars 42 and 43 by the transfer pins 48, the magnets 45 individual to said bars 43 will be energized to control the positioning of their associated type bars so that the latter will print the data corresponding to that appearing on the analyzed card and transmitted to the bars 42 by the closing of the sets of contacts 15. The elevation of the type bars 17 to printing position and their restoration may be controlled in a manner well understood in the art such, for example, as the means shown in the above identified pending application. Thus, springs 49 (Fig. 12) urge the type bars upwardly under the control of the common bail 50 which reciprocates vertically in synchronism with the action of the scanning device B, said control being such that the type bars will move upwardly until arrested in proper printing position. The subsequent downward movement of said bail 50, following the printing operation, then causes said bail to engage the type bars at the various positions in which they were arrested and restores them to the lower positions, at the same time again placing the springs 49 under tension.

Whenever a magnet 45 is energized, as described, its armature 51 will be attracted, against the action of its spring 52, to pull a link 53 connecting said armature to a latch 54 guided in a comb 55. Said latch is thus caused to release the associated type bar arresting pawl 56 which is then urged, by its spring 57, to engage a tooth 58 on the type bar corresponding to a punched index point in the analyzed card, thus arresting said type bar in proper position for printing. At the conclusion of the printing operation, which may be accomplished by any well known mechanism, and before the type bars start their return movement, the pawls 56 are disengaged from the teeth 58 by a common restoring bail 59 which is elevated to engage and rock the pawls by the action of an oscillatory arm 60, the operation of which may be accomplished in any well known manner. This operation restores the pawls to normal where they are in position to be re-engaged by the latches 54 and, in order to insure this re-engagement without entire dependence upon the armature springs 52, a common bail 61 is operated, by any known means and immediately after the operation of the bail 59, to positively restore said latches so that the parts will again assume the position shown in Fig. 1.

Reference is now made to Figs. 2 to 8 for a detailed description of the transfer unit D. Said unit comprises a stationary support or frame 62 upon which is mounted a block 63 of insulated material. Countersunk within this block are the bus bars 42 which have terminals 64 for connection to the various conductors 41. Hinged at 65 to the support 62 is the pivotal frame 66 which is movable from its closed or operative position of Figs. 2 and 7 to the open position of Fig. 8, in which latter position it is adapted to have mounted thereon, in association with the pins 48, the set-up sheet 16 when the latter is used for electrical control of the pins 48, the sheet being centered in position by two or more guide pins such as the one shown at 67 in Figs. 4 and 8. To manipulate the frame 66 and retain it in the closed position thereof, the handle 68 extending across the top of the unit is provided at each end thereof with a hook member 69 pivoted at 70 and adapted for engagment with a pin 71 on the frame 62 when the unit is in the closed position of Fig. 7. Spring controlled pawls 72 latch the hook members in opened position, as in Fig. 8, so as to maintain said members rigid while restoring the frame 66 to its closed position by means of the handle 68 and, when being so closed, said latches will contact the pins 71 and be released thereby from the members 69 to permit the latter to be swung about their pivots 70 to the position of Fig. 7 and thus be engaged with the pins 71 to retain the frame 66 in place.

The various conductive bars 43 are assembled in spaced relation in the frame 66, as illustrated in Figs. 2 to 4, by fitting the recessed upper and lower ends thereof on insulated supporting members 73 held in position within the frame by the rods 74, and each bar 43 is connected to one of the conductors 44, as shown in Fig. 4. Each bar 43 is provided with a series of openings 75 therethrough equal to the number of card columns, and each opening has mounted therein, for electrical contact with said bar, one of the transfer pins 48, and is counterbored at 76 to accommodate a spring 77 engageable with a head on the pin and with the inner end of the counterbore so as to normally urge the pin in the direction of the associated bus bar 42. Thus, when the master sheet 16 is used, as in Fig. 5, a pin 48 will engage an associated bar 42 wherever a hole 47 appears in the sheet so as to establish electrical connection between the bars 42, 43, or will contact said sheet when no hole is present, to prevent such electrical connection from being made.

Provision is made, when the master sheet is not employed, for the manual and individual adjustment of said pins 48 to operative and inoperative positions with respect to the associated bars 42 to thereby set up a transfer unit for a predetermined analysis. To this end, the opening 75 for each pin is enlarged at its outer end, as indicated at 78, and is provided at the inner end of such enlargement with a cam surface 79 adapted to be engaged by the opposed studs 80 on said pin, the enlargement being so formed that when the pin is given a turn, by an instrument inserted in the slot 81 thereof, the inner end of the pin will be caused by the cam surface 79 to move toward or away from its associated bar 42, as shown in dotted and full lines in Fig. 5a.

To protect the heads of the pins 48, a cover plate 83 is hinged, at 84, to the frame 66 and is further connected thereto by links 85 so that said plate may be swung to open position, as indicated in dotted lines in Fig. 7, when it is desired to expose the heads of the pins 48 for adjustment. In order to releasably retain the cover plate 83 in closed position (see Fig. 3), opposed side walls thereof have struck therefrom the detents 86 adapted to be engaged by the spring latches 87 which, by outward pressure thereon, will release the cover plate for swinging movement to open position.

What is claimed is:

1. In combination, a card analyzing means including elements assigned to each column of a card being analyzed and responsive to the sensing of punched holes in said column, a plurality of recording members, control means therefor, a scanning device movable relative to said responsive means and including an operating member for each card column actuated by any one of the responsive elements assigned to said column, sets of electrical switch contacts and an actuating member for each set individual to a card column and under the control of the operating member for said column, and a transfer unit comprising an analysis set-up sheet and electrically connected to said sets of switch contacts and to the control means for said recording members, said unit having means under the control of said set-up sheet for operating said control means through said electrical connections in accordance with the sensing of cards by said analyzing means.

2. In a combination, a card analyzing means including elements assigned to each column of a card being analyzed and responsive to the sensing of punched holes in said column, a plurality of recording members, control means therefor, a scanning device movable relative to said responsive means and including an operating member for each card column actuated by any one of the responsive elements assigned to said column, sets of electrical switch contacts and an actuating member for each set individual to a card column and under the control of the operating member for said column, a transfer unit comprising an analysis set-up sheet and a plurality of crossed bus bars, certain of said bars electrically connected to said sets of switch contacts and the others to said control means, and connecting elements carried by certain of said bars for electrical connection with other bars under the control of said set-up sheet.

3. In combination, a card analyzing means including elements assigned to each column of a card being analyzed and responsive to the sensing of punched holes in said column, a plurality of recording members, control means therefor, a scanning device movable relative to said responsive means and including an operating member for each card column actuated by any one of the responsive elements assigned to said column, sets of electrical switch contacts and an actuating member for each set individual to a card column and under the control of the operating member for said column, a transfer unit including a plurality of crossed bus bars, certain of which are electrically connected to said sets of switch contacts and the other to said control means, connecting elements carried by certain of said bars for electrical connection with other bars, and means to adjust said connecting elements to operative and inoperative positions relative to the last named bars.

4. In combination, card analyzing means including elements assigned to each column of a card being analyzed and responsive to the sensing of punched holes in said columns, a plurality of recording members, control means therefor, a scanning device movable relative to said responsive elements and including an operating member for each card column engageable with any one of the responsive elements assigned to said column for actuation thereby, sets of electrical switch contacts each assigned to one of said card columns and to one of said operating members, an actuating member for each set of contacts and engaged by the associated operating member throughout the movement of said scanning device, and a transfer unit having means electrically connected to said sets of switch contacts and to the control means for said recording members for operating said control means through said electrical connections in accordance with the analysis of cards by said analyzing means.

5. In combination, card analyzing means including elements assigned to each column of a card being analyzed and responsive to the sensing of punched holes in said columns, a plurality of recording members, control means therefor, a scanning device movable relative to said responsive elements and including an operating member for each card column engageable with any one of the responsive elements assigned to said column for actuation thereby, sets of electrical switch contacts each assigned to one of said card columns and to one of said operating members, an actuating member for each set of contacts and engaged by the associated operating member throughout the movement of said scanning device, a transfer unit comprising an analysis set-up sheet and a plurality of crossed bus bars, certain of said bars electrically connected to said sets of switch contacts and the others to said control means, and connecting elements carried by certain of said bars for electrical connection with others bars under the control of said set-up sheet.

6. In combination, card analyzing means including elements assigned to each column of a card being analyzed and responsive to the sensing of punched holes in said columns, a plurality of recording members, control means therefor, a scanning device movable relative to said responsive elements and including an operating member for each card column engageable with any one of the responsive elements assigned to said column for actuation thereby, sets of electrical switch contacts each assigned to one of said card columns and to one of said operating members, an actuating member for each set of contacts and engaged by the associated operating member throughout the movement of said scanning device, a transfer unit including a plurality of crossed bus bars, certain of which are electrically connected to said sets of switch contacts and the others to said control means, connecting elements carried by certain of said bars for electrical connection with other bars, and means to adjust said connecting elements to operative and inoperative positions relative to the last named bars.

7. In combination, card analyzing mechanism comprising groups of analyzing elements each assigned to a card column and actuated by the sensing of punched holes in said column, sets of electrical contacts each assigned to one of said card columns, an actuating member for each set of contacts and having a cross bar, a movable scanning device having an operating element individual to each group of analyzing elements and to one of said actuating members, said operating element movable with said scanning device for contact with an actuated analyzing element and for continuous contact with the cross bar of its associated actuating member to operate the latter to close its set of electrical contacts when said operating element contacts said actuated analyzing element, settable recording members, and means controlled by the closure of each set of said contacts for setting one of said recording members in accordance with the location of said actuated analyzing element in its group.

8. In combination, a card analyzer including groups of analyzing elements with the elements of each group being individual to an index point position in a column of a card being analyzed and being actuated by the presence of a perforation at its index point position, recording members, control means therefor, means individual to the group of analyzing elements for each card column and operated by an actuated element in said group, a switch assigned to each group of analyzing elements, means actuated by said individual means to close said switch when the latter means is operated by an actuated analyzing element, a transfer unit comprising a plurality of conducting elements certain of which are electrically connected to said switches and others to said control means to operate the latter to control said recording members when said switches are closed, connecting members in said unit for establishing electrical connection between conducting elements therein, and means to disable certain of said connecting members.

9. In combination, a card analyzer including groups of analyzing elements with the elements of each group being individual to an index point position in a column of a card being analyzed and being actuated by the presence of a perforation at its index point position, recording members, control means therefor, means individual to the group of analyzing elements for each card column and operated by an actuated element in said group, a switch assigned to each group of analyzing elements, means actuated by said individual means to close said switch when the latter means is operated by an actuated analyzing element, a transfer unit comprising a plurality of conducting elements certain of which are electrically connected to said switches and others to said control means to operate the latter to control said recording members when said switches are closed, connecting members in said unit for establishing electrical connection between conducting elements therein, and an analysis set-up sheet in said unit having means to establish electrical connections between certain of said conducting elements and connecting members while disabling connection between certain others of said elements and members.

WILLIAM WOCKENFUSS.

REFERENCES CITED

The following references are of record in the file of this patent:

UNITED STATES PATENTS

| Number | Name | Date |
| --- | --- | --- |
| 2,034,104 | Lasker | Mar. 17, 1936 |
| 2,060,431 | Spicer | Nov. 10, 1936 |
| 2,245,369 | Smith | June 10, 1941 |
| 2,290,827 | Thomas | July 21, 1942 |
| 2,336,111 | Mayorga | Dec. 7, 1943 |
| 2,418,363 | Minneci | Apr. 1, 1947 |